(12) United States Patent
Wang et al.

(10) Patent No.: US 11,296,527 B1
(45) Date of Patent: *Apr. 5, 2022

(54) EXTENDING BATTERY BACKUP UNIT SYSTEM SERVICE LIFE

(71) Applicant: Amazon Technologies, Inc., Seattle, WA (US)

(72) Inventors: Ligong Wang, Seattle, WA (US); Michael Jon Moen, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/787,838

(22) Filed: Feb. 11, 2020

Related U.S. Application Data

(63) Continuation of application No. 15/838,909, filed on Dec. 12, 2017, now Pat. No. 10,587,140.

(51) Int. Cl.
*H02J 7/00* (2006.01)
*G06F 1/30* (2006.01)
*H02J 9/06* (2006.01)

(52) U.S. Cl.
CPC .............. *H02J 7/0063* (2013.01); *G06F 1/30* (2013.01); *H02J 7/0013* (2013.01); *H02J 7/0047* (2013.01); *H02J 7/0069* (2020.01); *H02J 9/061* (2013.01)

(58) Field of Classification Search
CPC ...... H02J 7/0063; H02J 7/0069; H02J 7/0013; H02J 7/0047; H02J 7/0075; H02J 9/061; G06F 1/30
See application file for complete search history.

(56) References Cited

U.S. PATENT DOCUMENTS

2010/0007506 A1  1/2010  Fischer
2013/0069433 A1  3/2013  Fischer

OTHER PUBLICATIONS

U.S. Appl. No. 15/838,909 , "Non-Final Office Action", dated Jun. 11, 2019, 10 pages.
U.S. Appl. No. 15/838,909 , "Notice of Allowance", dated Oct. 21, 2019, 7 pages.

*Primary Examiner* — Carlos Amaya
(74) *Attorney, Agent, or Firm* — Kilpatrick Townsend & Stockton LLP

(57) ABSTRACT

A power supply system can include a plurality of battery backup units and a control unit. The battery backup units may be utilized to supply backup energy to a power supply unit, for example, in case of a power outage event. The control unit can gauge a respective capacity, temperature, age, and/or other characteristic of each respective battery backup unit of the plurality of battery backup units. The control unit can designate a particular battery backup unit of the plurality of battery backup units as a spared unit, e.g., to be spared in the power outage event. The designation may be based at least in part on the respective capacity or other characteristic of each respective battery backup unit gauged.

18 Claims, 5 Drawing Sheets

EXTENDING BATTERY BACKUP UNIT SYSTEM SERVICE LIFE

CROSS-REFERENCE TO RELATED APPLICATIONS

This application is a Continuation of U.S. patent application Ser. No. 15/838,909, filed Dec. 12, 2017, now U.S. Pat. No. 10,587,140 issued on Mar. 10, 2020, and entitled "EXTENDING BATTERY BACKUP UNIT SYSTEM SERVICE LIFE," which is incorporated herein by reference in its entirety.

BACKGROUND

Many critical electrically powered systems include one or more battery backup units that provide backup power to the system in the event of a loss of utility power. Battery backup units, however, can degrade over time to a point of not being capable of providing adequate backup power to the system in the event of loss of utility power. Moreover, respective cells of a battery backup unit may degrade at different rates, which may lead to erratic or irregular occasions for replacement that correspond to associated costs in upkeep and problems in predictability or reliability.

BRIEF DESCRIPTION OF THE DRAWINGS

Various embodiments in accordance with the present disclosure will be described with reference to the drawings, in which.

DETAILED DESCRIPTION

Figure 1:
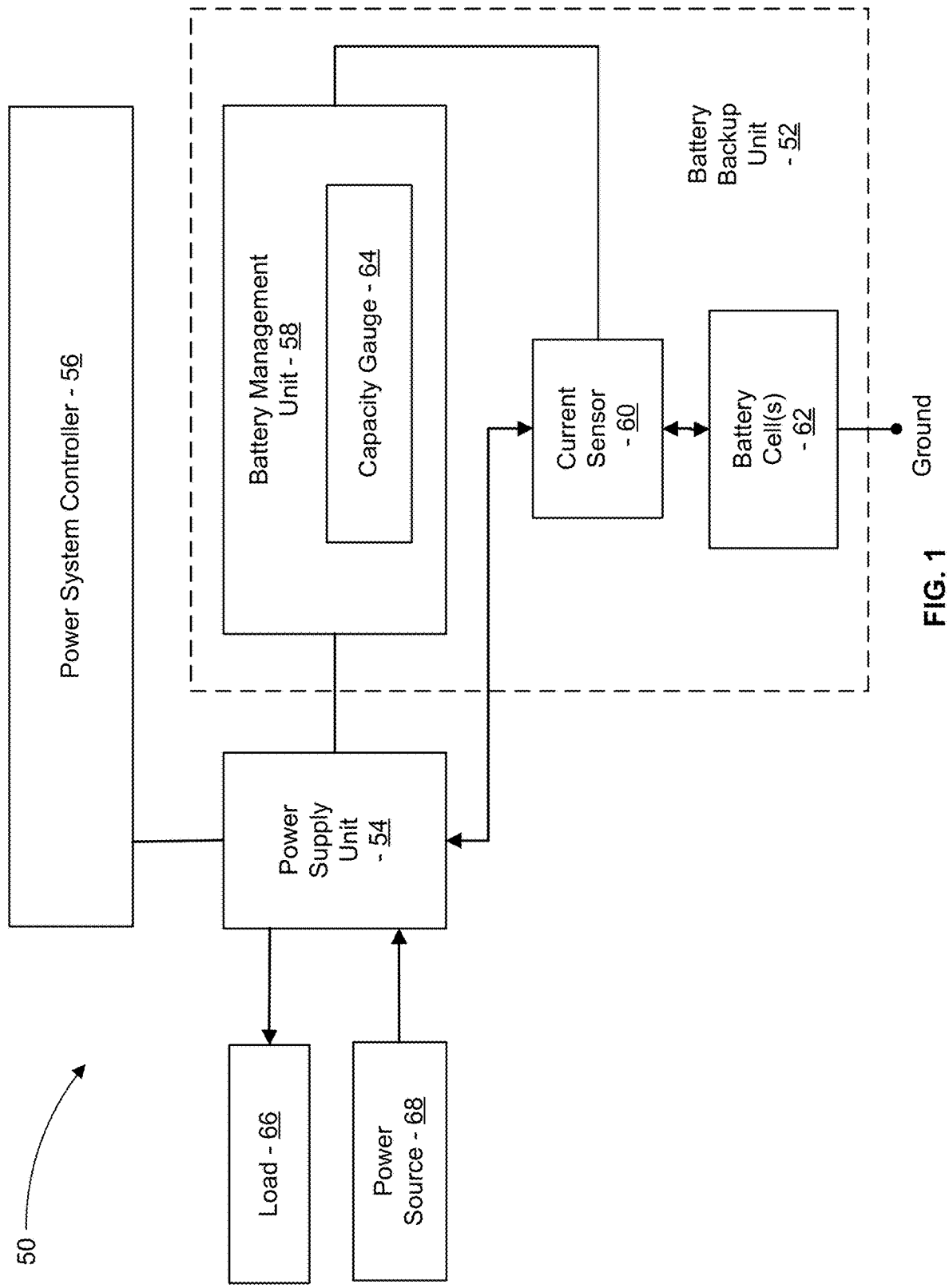
FIG. 1 is a simplified schematic diagram of a power supply system including a power system controller and a battery backup unit that includes a battery management unit with a capacity gauge, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods described herein extend battery life of a battery backup unit system by selectively disabling a subset of batteries from discharging during an outage event or by selectively reducing and/or restricting discharge amounts and/or or levels during an outage event. In many embodiments, such devices and/or techniques may take advantage of redundancy built into such battery backup unit systems. For example, a battery pack or other subset of batteries may be disabled or limited because the battery backup unit system includes enough batteries and/or capacity to render the disabled or limited batteries redundant or unneeded to provide adequate power to a power supply during an outage event. Selectively disabling or limiting usage of a subset of batteries may reduce wear on that subset (e.g., while retaining the subset of batteries as redundantly available in case of other battery failure) and extend useful life of that subset of batteries and the battery backup unit system as a whole.

In an illustrative example, the battery backup unit system features six backup battery packs each rated for a minimum capacity suitable for providing one fifth of a maximum expected load from the power supply, such that in normal operation any five of the six battery packs can collectively satisfy the load. Accordingly, the sixth battery pack may be deemed a single redundant battery pack, e.g. which may be useful in case any one of the other five battery packs unexpectedly fails and can no longer provide the rated minimum capacity. If one of these six includes a faulty battery cell that begins to degrade faster than in the other battery packs, subjecting the faulty battery pack to similar usage (e.g., charge and discharge cycles) as the other battery packs may cause the faulty pack to lose its ability to hold the minimum charge faster than the other battery packs, which may produce a need to replace all or part of the faulty battery pack before the end of the useful life of the other battery packs. In contrast, sparing the faulty battery pack from the same level of usage as the other battery packs can extend a period that the faulty battery pack can retain its ability to hold the minimum charge and thereby function as a suitable available and/or redundant battery pack. In implementation, a power system controller can accordingly gauge the capacity of each of the six battery packs, determine if any of the battery packs is showing a capacity that is significantly lower the others (e.g., thus indicating that one of the battery packs is a faulty battery pack), and designate the battery pack with the significantly lower capacity as a battery pack that will be spared from usage in case of a power outage event that will trigger usage of the battery packs.

In another illustrative example, a battery backup unit system with multiple batteries may control usage and sparing of batteries based on load demanded or expected to be demanded from the power supply. In implementation, a power system controller can gauge usage of a power supply and use that value to estimate a load that the power supply will need to use in case of a power outage. For example, during a period of low usage of computing resources powered by the power supply, the power system controller may gauge that the power supply is operating at 40% of its peak levels and that a reduced level (e.g., 50%) of backup power is suitable. Accordingly, the power system controller can designate one or more batteries to be spared (e.g., disabled or operated at a discharge rate that is less than maximum) in case of a power outage event. For example, if the battery backup unit system includes five battery packs each capable of providing 25% of the power supply's peak load demand (e.g., for a total capacity of 125% or four plus one redundancy), the power system controller could designate three of the battery packs to disable so that the two remaining battery packs each provide 25% of the load demand (for a total of the 50% target level). Alternatively, the power system controller could instead designate one of the battery packs to disable so that the four remaining battery packs each provide 12.5% the load demand (for the total of 50% target level). As a further option, the power system controller might designate the first and second battery packs to be disabled and plan to provide the full total 50% target level by designating the third and fourth battery packs to each provide 20% of the load demand and the fifth battery pack to provide 10% of the load demand (e.g. perhaps based on the fifth battery pack having been determined to be faulty or as having a lower capacity than the third and fourth battery packs).

Turning now to the drawings in which like reference indicators refer to like elements in the various figures, FIG. 1 is a simplified schematic diagram of a power supply system 50, in accordance with some embodiments. The power supply system 50 includes a battery backup unit 52, a power supply unit 54, and a power system controller 56. The battery backup unit 52 includes a battery management unit 58, a current sensor 60, and one or more battery cells 62. The battery management unit 58 includes a capacity gauge 64 that stores an estimate of the amount of energy that can be discharged from the battery cell(s) 62 from the current state of charge of the battery cell(s) 62 to a lower state of charge (e.g., a state of charge below which the battery management unit 58 blocks further discharge of the battery cell(s) 62 to prevent an undesirable under-voltage condition). The capacity gauge 64 can have any suitable configuration. For example, the battery management unit 58 can include one or more processor and a memory device that stores capacity data indicating the estimate of the amount of energy that can be discharged from the battery cell(s) 62 from the current state of charge of the battery cell(s) 62 to the lower state of charge.

In many embodiments, the power supply unit 54 is operable to supply electrical power (e.g., direct current (DC) power, alternating current (AC) power) to a load 66 at a rate (e.g., variable, constant) drawn by the load 66. The power supply unit 54 is operable to generate the electrical power supplied to the load 66 from electrical power (e.g., DC power, AC power) supplied to the power supply unit 54 by a power source 68. In the event that the power source 68 is incapable of supplying adequate electrical power to the power supply unit 54 to satisfy the power requirements of the load 66 (e.g., when the power source 68 is a utility power source that is experiencing a temporary outage), the power supply unit 54 is operable to draw DC power from the battery backup unit 52 and generate the electrical power supplied to the load 66 from the DC power drawn from the battery backup unit 52.

In many embodiments, the power supply unit 54 is operable to supply DC power to the battery backup unit 52 to charge the battery cell(s) 62. For example, in many embodiments, when the power source 68 is capable of supplying adequate electrical power to the power supply unit 54, the power supply unit 54 can simultaneously supply electrical power to the load 66 and DC power to the battery backup unit 52 to charge the battery cell(s) 62 to a predetermined high charge level (e.g., a full charge level for the battery backup unit 52).

In many embodiments, the capacity gauge 64 is continually updated based on the amount of current flowing into and out of battery cell(s) 62 as sensed by the current sensor 60 and a voltage level of the battery cells(s) 62. For example, during discharge of energy from the battery cell(s) 62 to the power supply unit 54, the current flowing from the battery cell(s) is sensed by the current sensor 60, which transmits a signal to the battery management unit 58 indicative of the magnitude of the current flowing from the battery cell(s) 62. The battery management unit 58 processes the signal from the current sensor 60 in combination with a voltage of the battery cell(s) 62 and elapsed time to measure energy discharged from the battery cell(s) 62. The battery management unit 58 repeatedly updates the capacity gauge 64 to reflect the amount of energy discharged from the battery cell(s) 62. During charging of the battery cells(s) 62, the battery management unit 58 processes the signal from the current sensor 60 in combination with a voltage of the battery cell(s) 62 and elapsed time to measure the energy charged into the battery cell(s) 62. The battery management unit 58 repeatedly updates the capacity gauge 64 to reflect the amount of energy charged into the battery cell(s) 62. The battery management unit 58 can additionally or alternatively update the capacity gauge 64 based on other calibration or gauging techniques.

Figure 2:
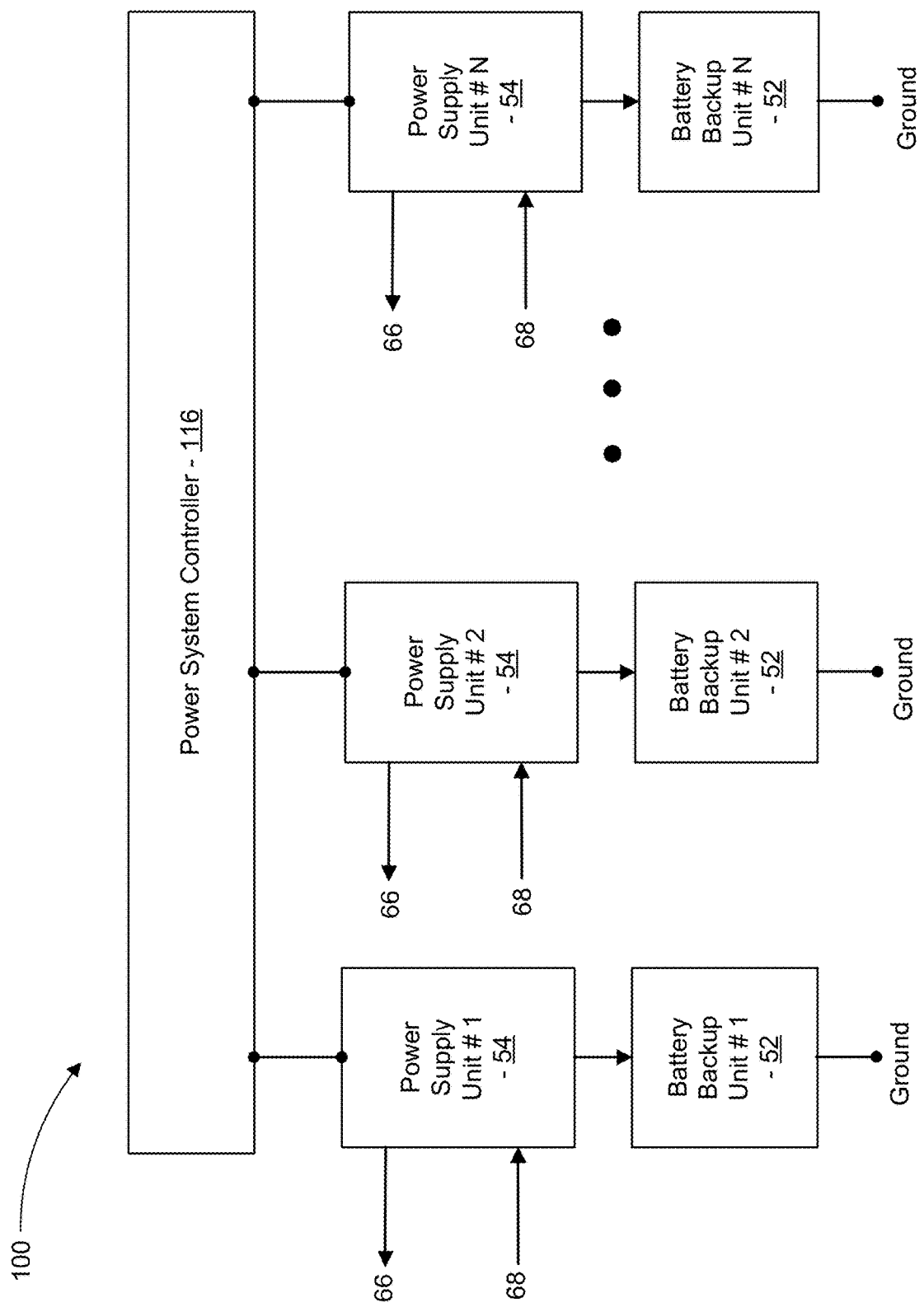
FIG. 2 is a simplified schematic diagram of a power supply system including a power system controller and battery backup units, each of the battery backup units including a battery management unit with a capacity gauge, in accordance with some embodiments.

FIG. 2 is a simplified schematic diagram of a power supply system 100, in accordance with some embodiments. The power supply system 100 is similar to the power supply system 50, but includes multiple pairs of a respective power supply unit 54 and a respective battery backup unit 52. Any suitable number of pairs of the power supply unit 54 and the battery backup unit 52 can be included in the power supply system 100.

In some embodiments, the power supply system 100 is configured to be mounted in a shelf of a server rack and operatively coupled with DC bus bars of the server rack to supply DC power to system loads mounted in the server rack. The power supply system 100 includes a power system controller 116 that is configured similar to the power system controller 56 of the power supply system 50 with the power system controller 116 being configured to control each of the power supply units 54 included in the power supply system 100. The power system controller 116 is communicatively coupled with each of the power supply units 54 to conduct capacity checks (e.g., as described above) to estimate total capacity of each of the battery backup units 52.

In many embodiments, each of the power supply units 54 can be connected to a shared load 66 (e.g., via DC bus bars of the server rack) and power source 68. During normal operation, the power source 68 supplies electrical power to each of the power supply units 54 and each of the power supply units 54 supply electric power to the load 66.

In some embodiments, the battery backup units 52 temporarily supply DC power to the power supply units 54 for use by the power supply units 54 to produce the DC power drawn by the load 66 while a generator is brought online when utility power is lost. In an example embodiment that has six total battery backup units 52, each of the battery backup units 52 is configured to have a minimum total capacity sufficient to supply 3 KW of power for three minutes and five of the battery backup units 52 are sufficient to provide a total design battery backup capacity of 15 KW for three minutes. As a result of having six total battery backup units 52 in the example embodiment, the power supply system 100 has one redundant battery backup unit 52 when all of the six battery backup units have the design minimum total capacity. In some embodiments, redundancy may permit one or more of the battery backup units 52 to be disabled or operated at a reduced level for all or part of a duration of an unplanned or other power outage event in a manner that can extend the useful life of the battery.

Figure 3:
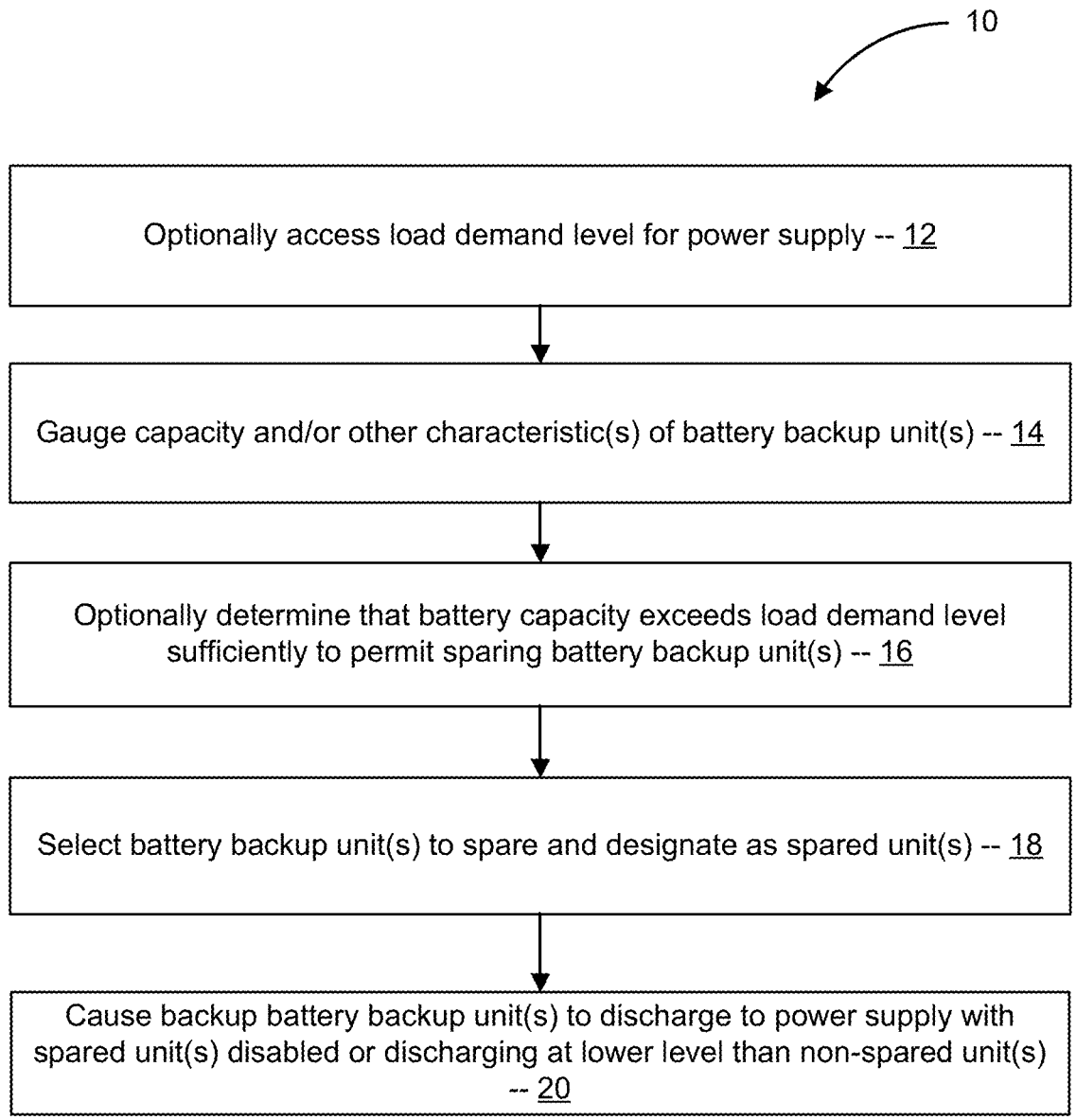
FIG. 3 is a flowchart illustrating a process of extending a battery backup unit system's service life by selecting a unit to spare during an outage event, in accordance with some embodiments.

FIG. 3 is a simplified schematic diagram of acts of a process 10 of extending battery backup unit system service life by selecting a unit to spare during an outage event, in accordance with some embodiments. Some or all of the process 10 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 10 depicted in FIG. 3 can be implemented to achieve a variety of battery discharge progressions. The process 10 can be implemented relative to various types of components. Various examples of such components are shown in FIGS. 1 and 2, e.g., as described above.

Referring again to FIG. 3, the process 10 includes gauging a characteristic (such as battery capacity) within a system to determine if any batteries are to be spared during a power outage event. At act 12, the process 10 can optionally include accessing a load demand level for the power supply. For example, this may include receiving an indication of a load demand level present when a power outage event occurs (e.g., via information gathered from the current sensor 60 in communication with the power supply unit 54 in response to the outage) or predicting a load demand level before a power outage event occurs (e.g., via information gathered from the current sensor 60 in communication with the power supply unit 54 in preparation for a possible outage). Accessing load demand level may allow a controller (such as the power system controller 56 or 116) to be load aware and use the demand level information to direct subsequent determinations or acts of the process 10. The act 12 is optional and can be can be omitted, for example, if the system is performing actions that are not directly predicated on load awareness.

The process 10 at act 14 includes gauging the capacity and/or other characteristic(s) of the battery backup unit(s). The system may gauge individual or collective capacity of the battery cell(s) 62 within a respective battery backup unit 52, for example, by querying the capacity gauge 64. In some embodiments, the individual battery capacities can be aggregated or an overall or combined capacity of the battery cells within a battery backup unit 52 and/or power supply system 100 can otherwise be determined. In some embodiments, other characteristics may be gauged in addition to or in lieu of capacity. For example, the gauging may include determining respective temperatures, respective age, or other respective characteristics that may affect longevity or wear on a battery backup unit 52.

At act 16, the process 10 can optionally include determining that battery capacity exceeds the load demand level sufficiently to permit sparing battery backup unit(s). For example, the power system controller 116 may compare the load demand level obtained at act 12 with a battery capacity obtained at act 14. In some embodiments, comparing the load demand level with the battery capacity may indicate how much extra battery capacity is available and accordingly the extent to which the batteries can be spared during an outage event. For example, the power system controller 116 may determine a number of battery backup units 52 that can be spared based on a number of increments of minimum battery capacity by which the overall capacity of the system 100 exceeds the demand level of the load 66.

By way of illustration with reference to the earlier example embodiment having six battery backup units 52 capable of supplying 3 KW of power for three minutes each for a total of 18 KW of power capacity, the power system controller 116 might register a load demand level of 14 KW (for example), determine that the extra capacity of 4 KW is between one and two increments of the 3 KW available from each battery backup unit 52, and accordingly determine that at least one battery backup unit 52 can be disabled or otherwise spared for an outage event. In a different scenario, if the same power system controller 116 registered a load demand level of 9 KW (e.g., corresponding to an extra capacity of 9 KW or three increments of the 3 KW individual capacity), the determination might be made that up to three battery backup units 52 can be disabled or otherwise spared.

The power system controller 116 additionally or alternatively can use other considerations apart from or in addition to increments for determining a number of battery backup units 52 that can be spared. In some embodiments, the power system controller 116 may base a number of battery backup units 52 that can be spared on predetermined amounts of operating capacity reduction. For example, if the power system controller 116 associated with the above-referenced set of six batteries capable of 3 KW apiece for a total of 18 KW is programmed to evaluate options for reducing operating capacity reduction by intervals of 1 KW per battery backup unit 52, then an accessed load level of 13 KW (e.g., 5 KW of excess capacity) might render a response in which five of the six battery backup units 52 are spared by being operated to provide 2 KW each (e.g., 1 KW less each than the rated capacity). Alternatively, the same accessed load level of 13 KW (e.g., 5 KW of excess capacity) might render a response in which two of the six battery backup units 52 are spared by being operated to provide 1 KW each (e.g., 2 KW less each than the rated capacity, accounting for 4 KW of the overage) and one other of the six battery backup units 52 is spared by being operated to provide 2 KW (e.g., 1 KW less than the rated capacity and accounting for the remaining overage). Any other suitable combination of sparing to account for at least some portion of the overage can additionally or alternatively be implemented.

At act 18, the process 10 can include selecting a battery backup unit to spare and designate as a spared unit. Any suitable criteria can be utilized for selecting a battery backup unit 52 to spare. In various embodiments, the criteria may be based on a characteristic gauged or otherwise determined at act 14. In some embodiments, a battery backup unit 52 having a lowest charge out of all others is designated. In some embodiments, a battery backup unit 52 that is a predetermined amount below another is selected (e.g., as described with respect to the difference 36 in FIG. 4, below). In some embodiments, the selection may be based on temperature. For example, a battery backup unit 52 that has a highest temperature in comparison to others may be selected to be spared, e.g., to reduce wear correlating to heat generation. In some embodiments, the selection may be based on age. For example, one or more battery backup units 52 that are older than others may be selected to be spared, e.g., to reduce wear on units that are likely to already have been subjected to more wear than others. In some embodiments, a battery backup unit 52 can be selected randomly for sparing, e.g., from a subset of battery backup unit 52 each determined to be suitable for sparing. For example, this may allow instances of sparing to be distributed among different battery backup units 52 of similar quality, e.g., so that all or some subset of units have an equal likelihood of being spared. In some embodiments, random selection may be implemented when sparing has been determined as feasible at act 16 and other criteria at act 18 are not dispositive (e.g., if there are zero or multiple battery backup unit 52 that are more than 30 Whr or other threshold difference lower than another or if a subset of battery backup unit 52 are approximately equal in capacity, temperature, and/or age such that there is not one in that subset that clearly has the lowest capacity or that would clearly benefit more than others in that subset from sparing).

At act 20, the method can include causing battery backup unit(s) to discharge to a power supply, with spared unit(s) disabled or discharging at a lower level than non-spared unit(s). For example, this may entail the power system controller 116 responding to an outage event by causing a battery backup unit 52 that was designated to be spared at act 18 to operate differently from other battery backup units 52 that were not designated to be spared at act 18. For example, the spared battery backup unit 52 may be disabled altogether during part or all of the outage event or may be controlled to discharge at a lower rate than other battery backup units 52 during part or all of the outage event.

Figure 4:
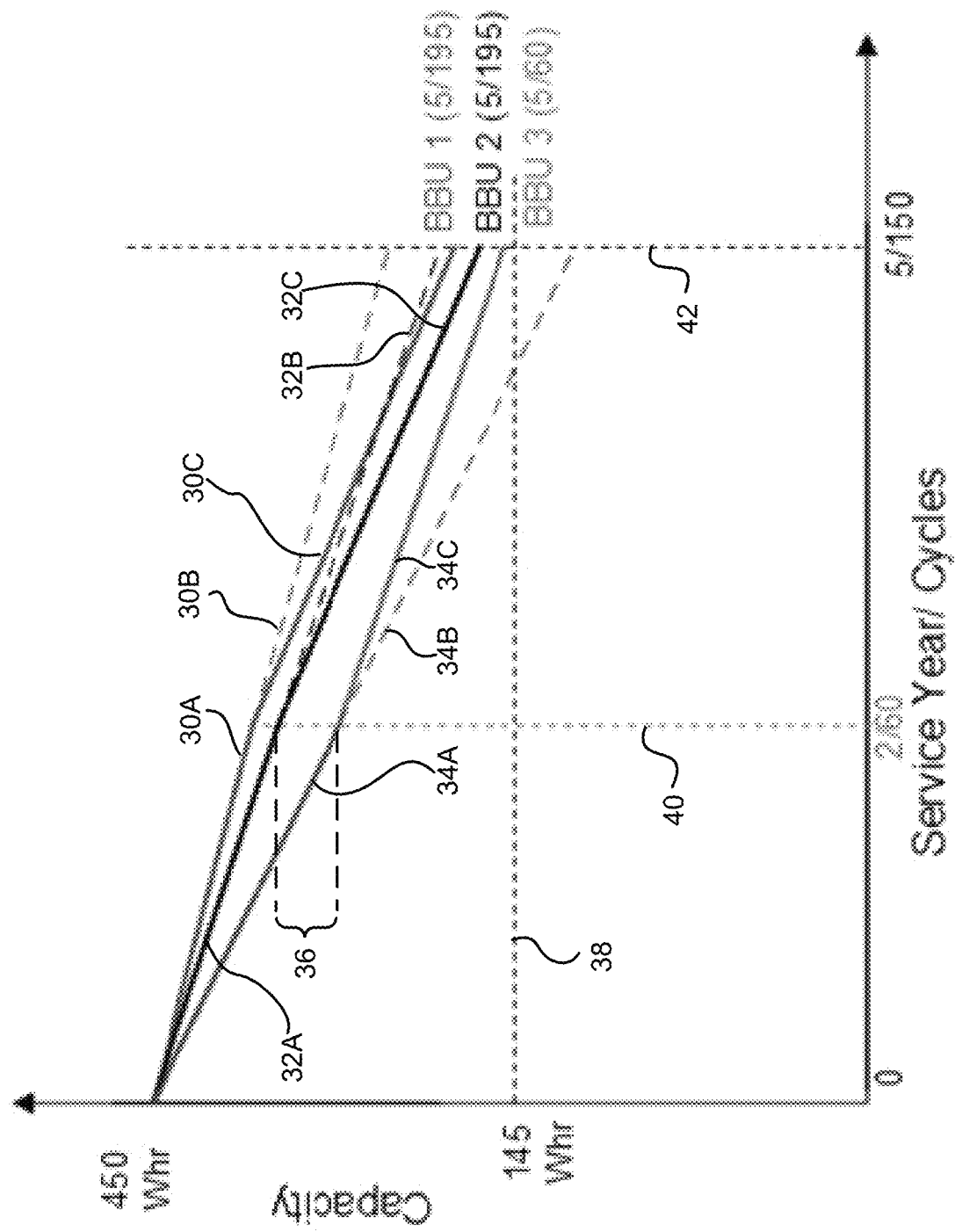
FIG. 4 is a graph illustrating examples of discharge characteristics of battery backup units of a system in different scenarios, in accordance with some embodiments.

FIG. 4 is a graph illustrating examples of discharge characteristics of battery backup units of a system in different scenarios, in accordance with some embodiments.

In FIG. 4, the vertical axis indicates capacity of respective battery backup units. Although the vertical units are shown in watt hours (Whr), the vertical units may alternatively correspond to any other unit of electrical energy. The horizontal axis indicates life of respective battery backup units. The horizontal units are represented alternatively in years of service or number of charge/discharge cycles and may alternatively correspond to any other unit indicative of term of life. The specific values presented on the graph in FIG. 4 are illustrative only and non-limiting to the present disclosure.

The graph in FIG. 4 shows characteristics of three battery backup units, respectively identified as BBU1, BBU2, and BBU3. Each begins with the same initial capacity (e.g., 450 Whr), which is well above a minimum capacity threshold 38 (e.g., 145 Whr) for suitably functioning for the backup power requirements of the system design. Prior to an initial milestone 40 (e.g., 2 years or 60 cycles), BBU1, BBU2, and BBU3 have been subjected to like conditions. A progression of the capacity of each up to this milestone 40 is shown by the respective lines 30A, 32A, and 34A. These trends are projected out to a subsequent milestone 42 (e.g., 5 years or 160 cycles) along respective lines 30B, 32C, and 34C.

With particular attention to line 34C, the projected progression indicates that, absent any change, BBU3 appears likely to continue to degrade faster than BBU1 and BBU2 and fall below the minimum capacity threshold 38 well before the later milestone 42 (e.g., which may correspond to a target end of useful life for the system featuring BBU1, BBU2, and BBU3). This accelerated degradation may be detected in a simple manner at the earlier milestone 40 by recognizing the difference 36 in capacity between BBU2 and BBU3 at the earlier milestone 40. For example, the difference 36 may be detected in response to gauging battery capacity in act 14 of the process 10 in FIG. 3. Quantitatively, the difference 36 exceeding a predetermined or particular threshold value may be indicative that BBU3 is degrading faster than BBU2 at a rate that will lead to premature failure absent other action. As an illustrative example, in some arrangements, the predetermined amount may be 30 Whr of difference, although other amounts of the difference 36 may be utilized. In implementation, BBU3 being detected as having a capacity that is lower by a difference 36 exceeding the predetermined amount (e.g., 30 Whr) may cause BBU3 to be selected to be spared at act 18 in the process 10 of FIG. 3.

Sparing BBU3 may change the respective capacity progressions of BBU1, BBU2, and BBU3. For example, sparing BBU3 may cause the capacity of BBU3 to degrade more slowly (e.g., following a different progression line of 34C in lieu of the progression line 34B), which may allow BBU3 to retain a capacity above the minimum capacity threshold 38 out to the latter milestone 42.

Sparing BBU3 may also cause BBU1 and BBU2 to be subjected to additional use that may accelerate their degradation (e.g., following respective different progression lines of 30C and 32C in lieu of the progression line 30B and 32B). For example, in the graph in FIG. 4, without any change, each of BBU1, BBU2, and BBU3 may have been slated to provide 150 cycles (i.e., 450 cycles total) by the time of reaching the latter milestone 42 (although BBU3 would have failed before reaching that mark). In contrast, due to sparing BBU3 by disabling it as of the earlier milestone 40 when it had already undergone 60 cycles, BBU3 reaches the latter milestone 42 having only undergone 60 cycles. This leaves 90 extra cycles to be distributed between BBU1 and BBU2 in addition to the 150 each was originally slated, so BBU1 and BBU3 are thus respectively shown as reaching the latter milestone having been subjected to 195 cycles each. As a result, in the graph in FIG. 4, BBU1 and BBU2 are shown reaching the later milestone 42 at lower levels than was projected for operation without sparing, yet still above the minimum capacity threshold 38. Thus, in the scenario shown in FIG. 4, BBU1, BBU2, and BBU3 are all able to reach the latter milestone 42 with suitable capacity for the system design, thereby eliminating any need and associated costs etc. to prematurely replace BBU3. Moreover, sparing BBU3 caused all three to reach the latter milestone 42 with capacity levels that are more closely clustered than if sparing had not been implemented. In implementation, such clustering may also be achieved at least in part by conducting subsequent capacity gauging at different life stages and altering which (if any) batteries are to be spared based on the gauging (e.g., such that a non-spared battery does not ultimately significantly drop below the capacity of a spared battery without changing the spared designation to cause equalizing between capacity levels).

Figure 5:
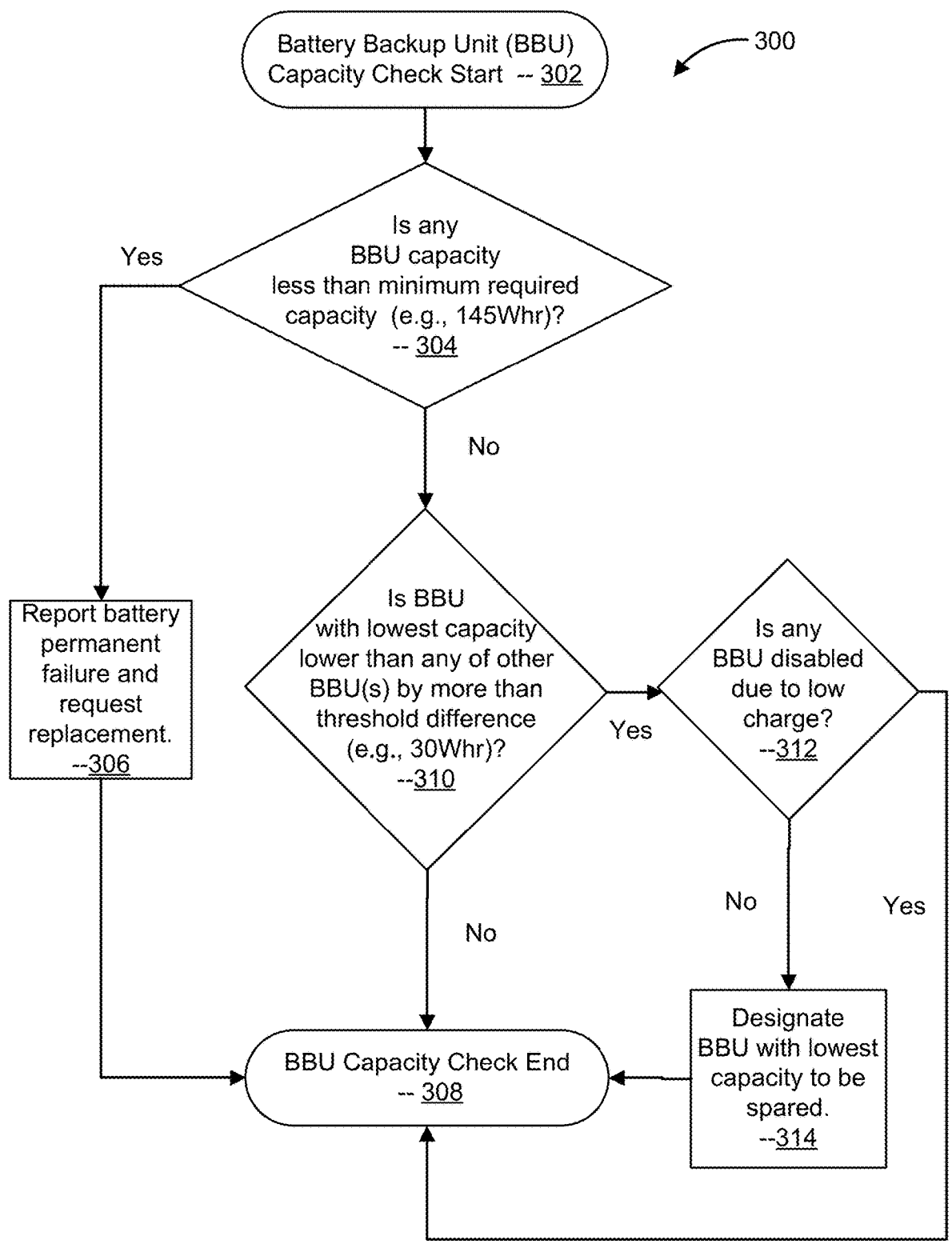
FIG. 5 is a flowchart illustrating a process of implementing capacity checking to facilitate selection of a unit to spare during an outage event, in accordance with some embodiments.

FIG. 5 is a flowchart illustrating a process 300 of implementing capacity checking to facilitate selection of a unit to spare during an outage event, in accordance with some embodiments. The process 300 can start at 302 and proceed to decision 304.

Decision 304 can include determining if any battery backup unit (hereinafter BBU) has a capacity that is less than a minimum required capacity (such as the 145 Whr amount shown by way of example in FIG. 4 for the minimum capacity threshold 38). If yes, the process 300 may continue at 306 and report battery permanent failure (e.g., due to falling below the minimum capacity threshold 38) and request replacement before proceeding to the end 308 of the capacity check process 300. If no, the process may continue at decision 310.

Decision 310 can include determining if the BBU with the lowest capacity is lower than any of the other BBU(s) by more than a threshold difference (such as the 30 Whr amount discussed above by way of example with respect to the difference 36 depicted in FIG. 4). If no, the process 300 may proceed to the end 308 of the capacity check process 300 (e.g., due to the process 300 indicating that none of the BBUs are sufficiently different in capacity from another to warrant sparing). If yes, the process may continue at decision 312.

Decision 310 can include determining if any BBU is disabled due to low charge. For example, a BBU may be disabled due a low charge as a result of undergoing a learning cycle or other cycle or operation during which the BBU is not available for providing backup power. Including the decision 310 may thus prevent the process 300 from triggering sparing when sufficient overall capacity is not available to support sparing. If yes at 312, the process 300 may proceed to the end 308 of the capacity check process 300 (e.g., due to the process 300 indicating that insufficient BBUs are available to support sparing). If no at 312, the process 300 may proceed to 314 and designate the BBU with the lowest capacity to be spared. This may correspond to providing a designation that will be accessed or triggered upon occurrence of an outage event to cause the BBU to be spared for part or all of the event. Following the act at 314, the process 300 may proceed to the end 308 of the capacity check process 300. In various embodiments, the capacity check process 300 can be conducted at multiple instances during the lifetime of a power supply system 100 featuring multiple battery backup units 52, e.g., to permit variations in which battery backup unit 52 will be spared and thus cause capacity fluctuations that will cause the battery backup units 52 to cluster together toward a uniform end of useful life.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A power supply system, comprising:
    a power supply unit;
    a plurality of battery backup units configured to collectively supply backup energy for a power outage event to a power supply unit, the plurality including at least a first unit and a second unit; and
    a control unit configured to:
        gauge a first capacity of the first unit;
        gauge a second capacity of the second unit;
        compare the first capacity with the second capacity to determine a difference by which the first capacity exceeds the second capacity;
        in response to the difference being more than a particular threshold, designate the second unit as a spared unit to be spared in the power outage event; and
        in response to occurrence of the power outage event and in response to the second unit being designated as the spared unit, cause the plurality of battery backup units to collectively supply backup energy to the power supply unit with the second unit discharging at a lower rate than the first unit.

2. The power supply system of claim 1, wherein the plurality of battery backup units is configured to supply a load of the power supply unit absent supply from the second unit.

3. The power supply system of claim 1, wherein the control unit is configured to designate the second unit as a spared unit in response to the second capacity being gauged as exceeding a minimum capacity requirement for the second unit.

4. The power supply system of claim 1, wherein the control unit is further configured to:
    access a demand level of a load for the power supply unit; and
    in response to the demand level being less than a collective capacity of the plurality of battery backup units, cause the first unit to discharge energy to the power supply unit at less than a maximum rate.

5. A power supply system control unit comprising a processor and a non-transitory computer-readable medium comprising processor-executable instructions to cause the processor to:
 gauge a respective capacity of each respective battery backup unit of a plurality of battery backup units each configured to supply backup energy for a power outage event to a power supply unit; and
 designate a particular battery backup unit of the plurality of battery backup units as a spared unit to be discharged at a lower rate than another battery backup unit of the plurality of battery backup units in the power outage event based on the respective capacity of each battery backup unit.

6. The power supply system control unit of claim 5, wherein the spared unit is selected to be spared based on the respective capacity gauged for the spared unit being lower than the respective capacities of the other battery backup units.

7. The power supply system control unit of claim 5, wherein the spared unit is selected to be spared based on the respective capacity gauged for the spared unit being lower by more than a particular threshold than a respective capacity of another battery backup unit.

8. The power supply system control unit of claim 5, wherein the spared unit is randomly selected from among a subset of the plurality of battery backup units.

9. The power supply system control unit of claim 5, wherein the processor-executable instructions of the control unit are further configured to cause the processor to:
 access a demand level of a load for the power supply unit; and
 compare the demand level with a sum of the respective capacities gauged to determine an excess capacity of the plurality of battery backup units; and
 wherein the spared unit is designated to be not used as much as the other battery backup units in the power outage event by discharging at a rate reduced from a maximum rate of the spared unit and based on the excess capacity determined.

10. The power supply system control unit of claim 5, wherein:
 the plurality of battery backup units includes a first unit and a second unit; and
 the processor-executable instructions of the control unit are further configured to cause the processor to:
  compare a first capacity of the first unit with a second capacity of the second unit to determine a difference by which the first capacity exceeds the second capacity;
  designate the second unit as the spared unit to be spared in the power outage event based on the difference being more than a particular threshold; and
  in response to occurrence of the power outage event and in response to the second unit being designated as the spared unit, cause the plurality of battery backup units to collectively supply backup energy to the power supply unit without the second unit discharging or with the second unit discharging at a lower rate than the first unit.

11. A method comprising:
 gauging a respective characteristic of each of a plurality of battery backup units configured to supply backup energy to a power supply unit; and
 designating, based on the gauging, a particular battery backup unit of the plurality of battery backup units as a spared unit to be spared and discharged at a lower rate than another battery backup unit of the plurality of battery backup units when supplying backup energy to a power supply unit.

12. The method of claim 11, further comprising:
 determining a demand level of a load for the power supply unit;
 reducing a first discharge rate of a first unit of the plurality of battery backup units based on the demand level; and
 reducing a second discharge rate of a second unit of the plurality of battery backup units to be lower than the first discharge rate based on a second capacity of the second unit being lower than a first capacity of the first unit.

13. The method of claim 11, further comprising:
 determining a demand level of a load for the power supply unit;
 determining a collective capacity of the plurality of battery backup units based on the gauging; and
 comparing the collective capacity with the demand level;
 wherein the designating of the particular battery backup unit as the spared unit is further based on the collective capacity exceeding the demand level by at least an amount available from the maximum rate of discharge from the spared unit.

14. The method of claim 11, further comprising:
 in response to an event indicating a need for backup energy to the power supply unit, causing the plurality of battery backup units to collectively supply backup energy to the power supply unit without the spared unit discharging at the maximum rate of discharge.

15. The method of claim 11, further comprising:
 selecting the particular battery backup unit of the plurality of battery backup units as the spared unit based on the gauging indicating that a capacity of the particular battery backup unit is lower than two other battery backup units of the plurality of battery backup units.

16. The method of claim 11, wherein the respective characteristic comprises temperature, capacity, or age.

17. The method of claim 11, wherein the spared unit is designated to be prevented from discharging to supply backup energy to the power supply unit.

18. The method of claim 11, wherein the designating of the particular battery backup unit of the plurality of battery backup units as the spared unit comprises designating multiple battery backup units of the plurality of battery backup units to be spared.

* * * * *